(12) United States Patent
Huang

(10) Patent No.: US 8,810,099 B2
(45) Date of Patent: Aug. 19, 2014

(54) POWER MAGNETIC PLANETARY GEAR SET

(76) Inventor: Cheng-Chi Huang, Hualien County (TW)

(*) Notice: Subject to any disclaimer, the term of this patent is extended or adjusted under 35 U.S.C. 154(b) by 284 days.

(21) Appl. No.: 13/411,632

(22) Filed: Mar. 5, 2012

(65) Prior Publication Data

US 2013/0229081 A1 Sep. 5, 2013

(51) Int. Cl.
*H02K 16/00* (2006.01)
*H02K 7/116* (2006.01)
*H02K 16/02* (2006.01)

(52) U.S. Cl.
CPC .............. *H02K 16/00* (2013.01); *H02K 7/116* (2013.01); *H02K 16/02* (2013.01)
USPC .............. 310/114; 310/113; 310/112; 310/46

(58) Field of Classification Search
CPC ............................... H02K 16/02; H02K 7/116
USPC ........................................... 310/112–114, 46
See application file for complete search history.

(56) References Cited

U.S. PATENT DOCUMENTS

| | | | | |
|---|---|---|---|---|
| 4,691,119 A * | 9/1987 | McCabria | ........................ | 307/84 |
| 5,712,519 A * | 1/1998 | Lamb | ................................ | 310/95 |
| 6,707,190 B2 * | 3/2004 | Leibowitz | .................... | 310/75 R |
| 7,469,858 B2 * | 12/2008 | Edelson | ...................... | 244/103 S |
| 7,965,007 B2 * | 6/2011 | Dahlen | ........................ | 310/112 |
| 7,999,427 B2 * | 8/2011 | Wilson et al. | .................... | 310/83 |
| 2007/0029888 A1 * | 2/2007 | Schuler et al. | ................ | 310/112 |
| 2010/0156221 A1 * | 6/2010 | Dooley | ......................... | 310/114 |
| 2010/0201217 A1 * | 8/2010 | Dahlen | .......................... | 310/113 |
| 2011/0163623 A1 * | 7/2011 | Rens et al. | ..................... | 310/114 |

* cited by examiner

*Primary Examiner* — Thanh Lam
(74) *Attorney, Agent, or Firm* — Jianq Chyun IP Office

(57) ABSTRACT

A power magnetic planetary gear set uses stator of a motor to provide electrically generated magnetic sections. The electrically generated magnetic sections are variable under the excitation control of coils and driver so that either the outer stator or the sun stator of the magnetic planetary gear set may be stationary and still provide self-revolutionary magnetic forces toward the planet gears disposed therebetween. The planet gears are also mounted on planet arms so as to revolve on their own axes and have orbital revolution with respect to the sun stator.

26 Claims, 8 Drawing Sheets

POWER MAGNETIC PLANETARY GEAR SET

BACKGROUND OF THE INVENTION

1. Field of the Invention

The invention relates to a planetary gear set, and more particularly, to a power magnetic planetary gear set using electrical stator in either the outer gear and/or the sun gear.

2. Description of the Prior Art

Gear transmission mechanism is widely applied in industries for power conveying, power generation, speed transmission, etc. A planetary gear set is a special type of gear transmission mechanism that conveys and adjusts rotational torque. Planetary gear sets are highly adaptive for implementation in electrical vehicles, hybrid vehicles, and wind turbines. Its three separate components—the sun gear, the planet gears, and the outer gear, can be arbitrarily linked to a motor or a generator for various designed functions. Today, magnetic gears, which are powered by high performance magnets, have been applied in the planetary gear set. The contact-free magnetic planetary gear set may be well used in conveyers with less maintenance effort, higher reliability and miniaturizing dimension. However, when functioning, magnetic planetary gear set that uses magnets, which have invariant polarity, requires both the outer gear and the sun gear being revolving in order to effectively propel the planet gears therebetween to self-revolve or orbitally revolve with respect to the sun gear.

SUMMARY OF THE INVENTION

To make a featured alteration on conventional planetary gear set, electrically powered magnetic gears have been introduced in the embodiments of the invention.

An embodiment of the invention includes a magnetic planetary gear set. The magnetic planetary gear set includes an outer stator, a sun gear and a plurality of planet gears. The outer stator is stationary and including a body and a plurality of teeth circularly arranged along an inner surface of the body. Each of the teeth includes a pole head. One or a plurality of neighboring pole heads is intertwined with and excited by at least a group of coils to form a variable magnetic section. The plurality of pole heads forms a plurality of similar variable magnetic sections in interlaced polarities. The polarity of each pole head is changed under the coil excitation control of a driver. The sun gear is disposed at an inner center of the outer stator. The sun gear revolves on its own axis and includes a first axle and a plurality of magnetic elements circularly arranged along the surface of the first axle, wherein the plurality of magnetic elements aligns with one another in interlaced polarities. The plurality of planet gears is disposed between the outer stator and the sun gear. Each planet gear includes a second axle and a plurality of magnetic elements circularly arranged along the surface of the second axle. The plurality of planet gears is mounted on planet arms.

Another embodiment of the invention includes a magnetic planetary gear set. The magnetic planetary gear set includes an outer gear, a sun stator, and a plurality of planet gears. The outer gear revolves on its own axis and includes a body and a plurality of magnetic elements circularly arranged along an inner surface of the body, wherein the plurality of magnetic elements aligns with one another in interlaced polarities. The sun stator is disposed at an inner center of the outer gear. The sun stator is stationary and includes a first axle and a plurality of teeth circularly arranged along the surface of the first axle. Each of the teeth includes a pole head. One or a plurality of neighboring pole heads is intertwined with and excited by at least a group of coils to form a variable magnetic section. The plurality of pole heads forms a plurality of similar variable magnetic sections in interlaced polarities. The polarity of each pole head is changed under the coil excitation control of a driver. The plurality of planet gears is disposed between the outer gear and the sun stator. Each planet gear includes a second axle and a plurality of magnetic elements circularly arranged along the surface of the second axle. The plurality of planet gears is mounted on planet arms.

Still another embodiment of the invention includes a magnetic planetary gear set. The magnetic planetary gear set includes an outer stator, a sun stator, and a plurality of planet gears. The outer stator is stationary and includes a body and a plurality of first teeth circularly arranged along an inner surface of the body. Each of the first teeth includes a first pole head. One or a plurality of neighboring first pole heads is intertwined with and excited by at least a group of coils to form a variable magnetic section. The plurality of first pole heads forms a plurality of similar variable magnetic sections in interlaced polarities. The polarity of each first pole head is changed under the coil excitation control of a first driver. The sun stator is disposed at an inner center of the outer stator. The sun stator is stationary and includes a first axle and a plurality of second teeth circularly arranged along the surface of the first axle. Each of the second teeth includes a second pole head. One or a plurality of neighboring second pole heads is intertwined with and excited by at least a group of coils to form a variable magnetic section. The plurality of second pole heads forms a plurality of variable magnetic sections in interlaced polarities. The polarity of each second pole head is changed under the coil excitation control of a second driver. The plurality of planet gears is disposed between the outer stator and the sun stator. Each planet gear includes a second axle and a plurality of magnetic elements circularly arranged along the surface of the second axle. The plurality of planet gears is mounted on planet arms.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
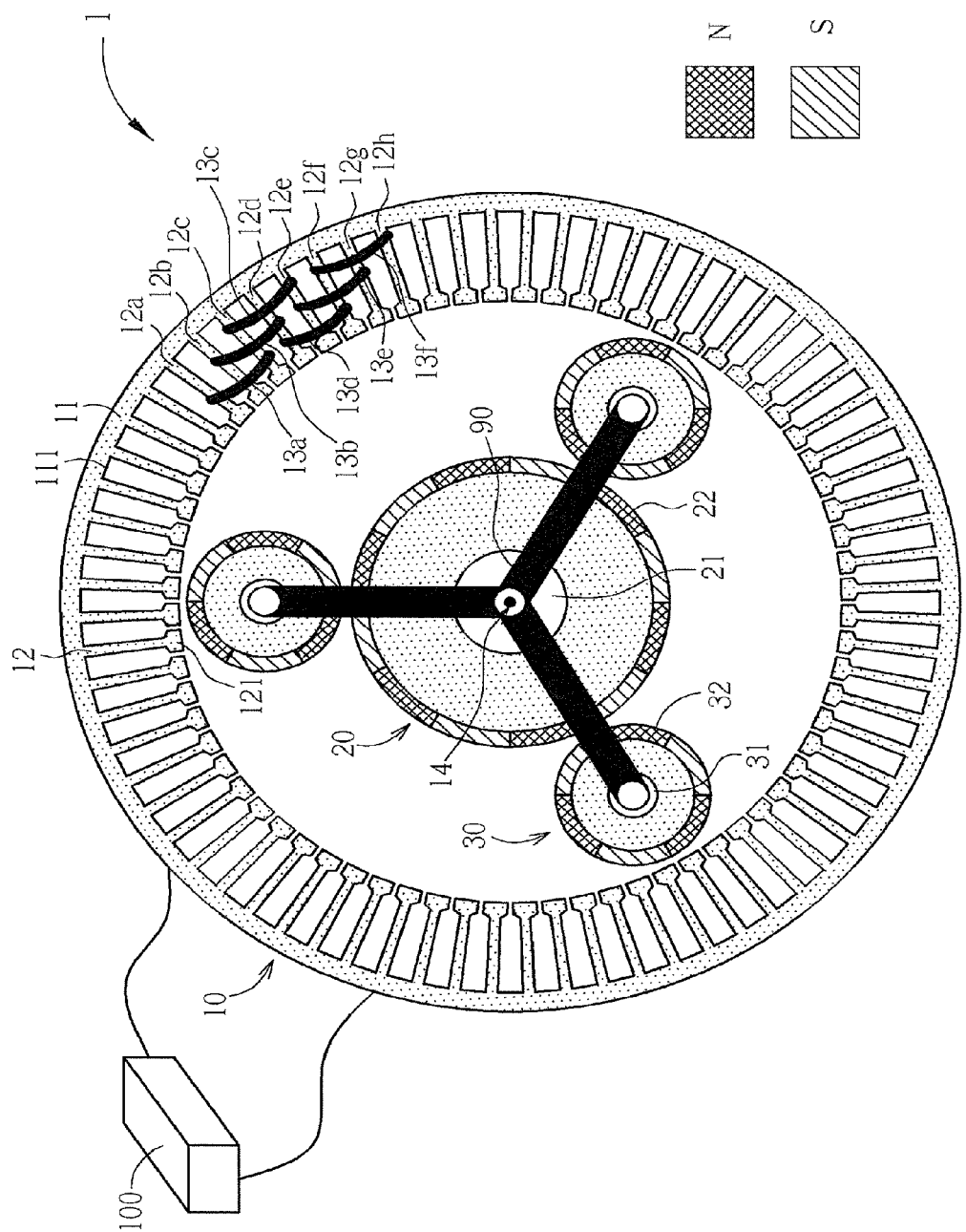
FIG. 1 is an illustration of a magnetic planetary gear set according to a first embodiment of the invention.

Please refer to FIG. 1, which is an illustration showing a magnetic planetary gear set 1 according to a first embodiment of the invention. The magnetic planetary gear set 1 includes an outer stator 10, a sun gear 20, and a plurality of planet gears 30. The outer stator 10 has a circular body 11 and a plurality of teeth 12 extending radially from the body 11 toward an inner center 14 of the outer stator 10. The plurality of teeth 12 is circularly arranged along an inner surface 111 of the body 11 as shown in FIG. 1. Each tooth 12 has a pole head 121, which is preferably arc-shaped, and all arc-shaped surfaces of the pole heads 121 form a circular contour with the same inner center 14 as the outer stator 10. In various embodiments of the invention, the pole heads 121 may be implemented with straight type or skew type. The skew type pole heads 121 may be made of multilayered silicon steels stacked in a similar way as the magnetic elements arranged in FIG. 5 or FIG. 6. The outer stator 10 is implemented as a variable electrically powered magnetic gear as described in detail as followed, which is stationary and needs no additional mechanism that is used in conventional outer gear. In short, the outer stator 10 functions both as a mechanical gear and a stator of a motor/generator.

The sun gear 20 is disposed at the inner center 14 of the outer stator 10 and has the same center of axis as the outer stator 10. The sun gear 20 includes a first axle 21 and a plurality of magnetic elements 22 circularly arranged along the surface of the first axle 21. The magnetic elements 22 are implemented preferably as permanent magnets aligning with one another in interlaced polarities as shown in FIG. 1. The plurality of planet gears 30, three in the first embodiment in FIG. 1 as an example, is disposed between the outer stator 10 and the sun gear 20. Each of the planet gears 30 includes a second axle 31 and a plurality of magnetic elements 32, which are implemented preferably as permanent magnets circularly arranged along the surface of the second axle 31 and aligning with one another in interlaced polarities as shown in FIG. 1.

In the first embodiment in FIG. 1, the sun gear 20 revolves on its own axis, while the outer stator 10 is served as a stator of a motor/generator and provides variable magnetic sections toward the planet gears 30. FIG. 1 shows how the outer stator 10 can provide variable magnetic sections, which shows only a portion of coils for brevity purpose and can be easily understood by applying such knowledge to the rest of the outer stator 10 where coils are not illustrated in the figure. The outer stator 10 provides variable magnetic sections when the pole heads 121 are grouped to be excited. Either one or a plurality of pole heads 121 can be put together as a group. For example, pole heads 121 of the teeth 12a, 12b, and 12c are intertwined with the group of coils 13a, pole heads 121 of the teeth 12b, 12c, and 12d are intertwined with the group of coils 13b, pole heads 121 of the teeth 12c, 12d, and 12e are intertwined with the group of coils 13c, pole heads 121 of the teeth 12d, 12e, and 12f are intertwined with the group of coils 13d, pole heads 121 of the teeth 12e, 12f, and 12g are intertwined with the group of coils 13e, and pole heads 121 of the teeth 12f, 12g, and 12h are intertwined with the group of coils 13f. The rest of the pole heads 121 as intertwined with coils in the same manner. In such way, every three neighboring pole heads 121 are intertwined with a group of coils. The pole heads 121 are excited by each corresponding group of coils, which are connected to a driver 100, to form a variable magnetic section. The outer stator 10 then has a plurality of variable magnetic sections. It should be noted that all the groups of coils are connected to the driver 100 and intertwine each one or many pole heads 121 as a way to form each magnetic section with a designated variable polarity, and the polarity of each pole head 121 is then capable of being changed under the coil excitation control of the driver 100. It should also be noted that, in the embodiments of the invention, the plurality of variable magnetic sections formed by the pole heads 121 aligns with one another in interlaced polarities.

For example, let's say that in time interval 0, the polarity of the pole heads 121 of the teeth 12a, 12b, and 12c, which are intertwined with the group of coils 13a, is N under the control of the driver 100, while the polarity of the pole heads 121 of the teeth 12d, 12e, and 12f, which are intertwined with the group of coils 13d, is S under the control of the driver 100. In the next time interval, i.e., time interval 1, the group of coils 13b is provided with current by the driver 100 so that the polarity of the pole heads 121 of the teeth 12b, 12c, and 12d, which are intertwined with the group of coils 13b, is now N, where the polarity of the pole head 121 of the tooth 12d is changed from S to N, and the group of coils 13e is provided with current by the driver 100 so that the polarity of the pole heads 121 of the teeth 12e, 12f, and 12g, which are intertwined with the group of coils 13e, is now S, where the polarity of the pole head 121 of the tooth 12g is supposedly changed from N to S. With such working principle followed on each pole head 121, the outer stator 10 can provide a plurality of magnetic sections with interlaced polarities that provides electrically generated magnetic fields and 'moves' clockwise or counterclockwise.

Although examples are given as that every three neighboring pole heads 121 are grouped as a variable magnetic section in the above embodiment, it should not be regarded as the limitations of the invention. In other embodiments of the invention, implementation can also be that two or more pole heads 121 are intertwined by a group of coils, even every single pole head 121 being intertwined by a group of coils.

As previously mentioned, each pole head 121 is arc-shaped and all pole heads 121 form a circular contour. The pole heads 121 face the magnetic elements 32 of the planet gears 30. Since every one or more neighboring pole heads 121 are grouped to form a same variable magnetic section produced by the coils and the driver 100, the magnetic elements 32 of the planet gears 30 are capable of being propelled or attracted by the variable magnetic sections of the outer stator 10. The plurality of planet gears 30 may also be mounted on planet arms 90 as shown in FIG. 1, which provides different working modes by use of the planet arms 90. For one applying environment, the planet gears 30 are propelled and/or attracted to revolve on their own axes by the variable magnetic sections of the outer stator 10 and/or the magnetic sections 22 of the sun gear 20, when the planet arms 90 are set to fix each planet gear 30 at a position. For another applying environment, the planet gears 30 are propelled and/or attracted to revolve on their own axes and simultaneously have orbital revolution with respect to the sun gear 20 by the variable magnetic sections of the outer stator 10 and/or the magnetic sections 22 of the sun gear 20, when the planet arms 90 are set to allow the planet gears 30 to have displacement.

Figure 2:
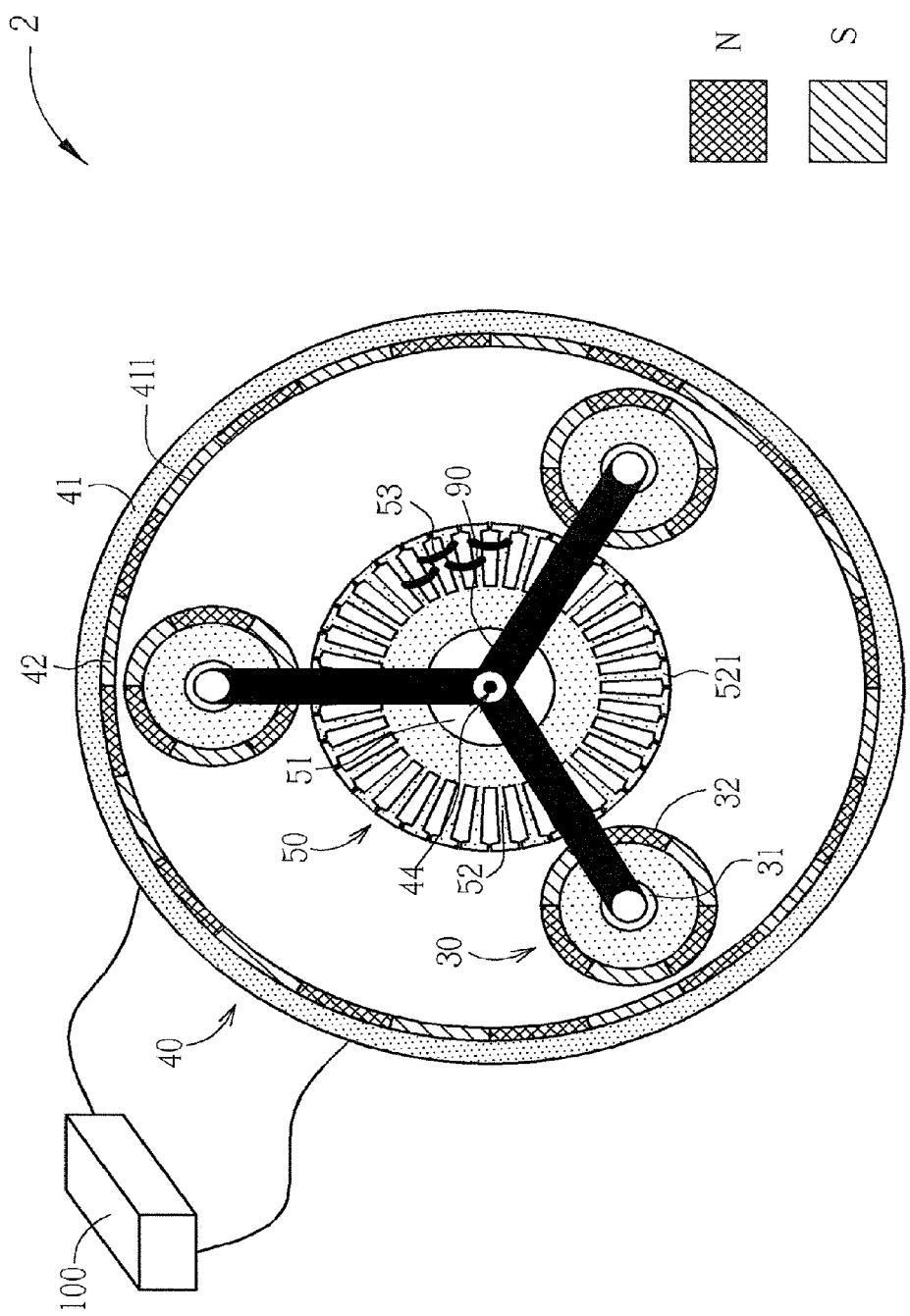
FIG. 2 is an illustration of a magnetic planetary gear set according to a second embodiment of the invention.

Please refer to FIG. 2, which is an illustration showing a magnetic planetary gear set 2 according to a second embodiment of the invention. In the second embodiment, the magnetic planetary gear set 2 includes an outer gear 40, a sun stator 50, and a plurality of planet gears 30. The outer gear 40 has a circular body 41 and a plurality of magnetic elements 42. The plurality of magnetic elements 42 is circularly arranged along an inner surface 411 of the body 41 as shown in FIG. 2. The magnetic elements 42 are implemented preferably as permanent magnets aligning with one another in interlaced polarities as shown in FIG. 2.

The sun stator 50 is disposed at the inner center 44 of the outer gear 40 and has the same center of axis as the outer gear 40. The sun stator 50 includes a first axle 51 and a plurality of teeth 52 extending radially from the surface of the first axle

51. The plurality of teeth 52 is circularly arranged along the surface of the first axle 51 as shown in FIG. 2. Each tooth 52 has a pole head 521, which is preferably arc-shaped, and all arc-shaped surfaces of the pole heads 521 form a circular contour with the same inner center 44 as the outer gear 40. The plurality of planet gears 30, like the first embodiment in FIG. 1, is disposed between the outer gear 40 and the sun stator 50. For the second embodiment, the sun stator 50 is implemented as a variable electrically powered magnetic gear similar with the outer stator 10 in the first embodiment in FIG. 1, which is stationary and needs no additional mechanism that is used in conventional outer gear.

In the second embodiment, the outer gear 40 revolves on its own axis, the inner center 44, while the sun stator 50 is served as a stator of a motor/generator and provides similar variable magnetic sections toward the planet gears 30. The working principle of the sun stator 50 is similar with what is described previously about the outer stator 10 in the first embodiment. In the second embodiment, though, every two pole heads 521 of the teeth 52 of the sun stator 50 are intertwined with and excited by a group of coils 53 and the polarity of each pole head 521 is changed under the excitation control of the driver 100.

With the sun stator 50 in the second embodiment, each pole head 521 is arc-shaped and all pole heads 521 form a circular contour. The pole heads 521 face the magnetic elements 32 of the planet gears 30. Since every one or more neighboring pole heads 521 are grouped to form a variable magnetic section produced by the coils 53 and the driver 100, the magnetic elements 32 of the planet gears 30 are capable of being propelled and/or attracted to revolve on their own axes and simultaneously have orbital revolution with respect to the sun stator 50 by the variable magnetic sections of the sun stator 50 and/or the magnetic elements 42 of the outer gear 40.

Figure 3:
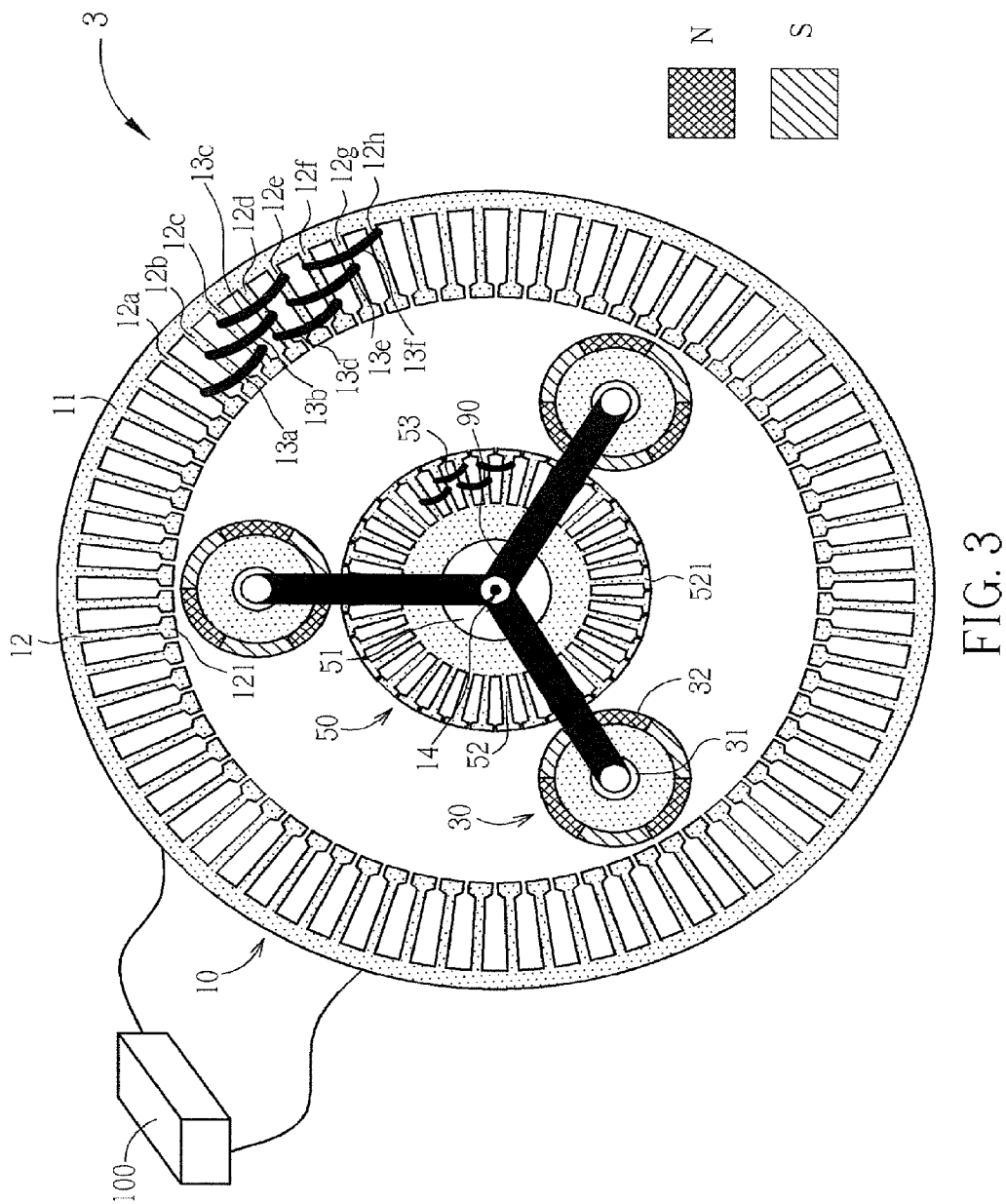
FIG. 3 is an illustration of a magnetic planetary gear set according to a third embodiment of the invention.

Please refer to FIG. 3, which is an illustration showing a magnetic planetary gear set 3 according to a third embodiment of the invention. In the third embodiment, the magnetic planetary gear set 3 includes an outer stator 10, a sun stator 50, and a plurality of planet gears 30. Both the outer stator 10 and the sun stator 50 are implemented as variable electrically powered magnetic gear similar with the outer stator 10 and the sun stator 50 in the previous embodiments, which are stationary and needs no additional mechanism that is used in conventional outer gear and sun gear.

Figure 4:
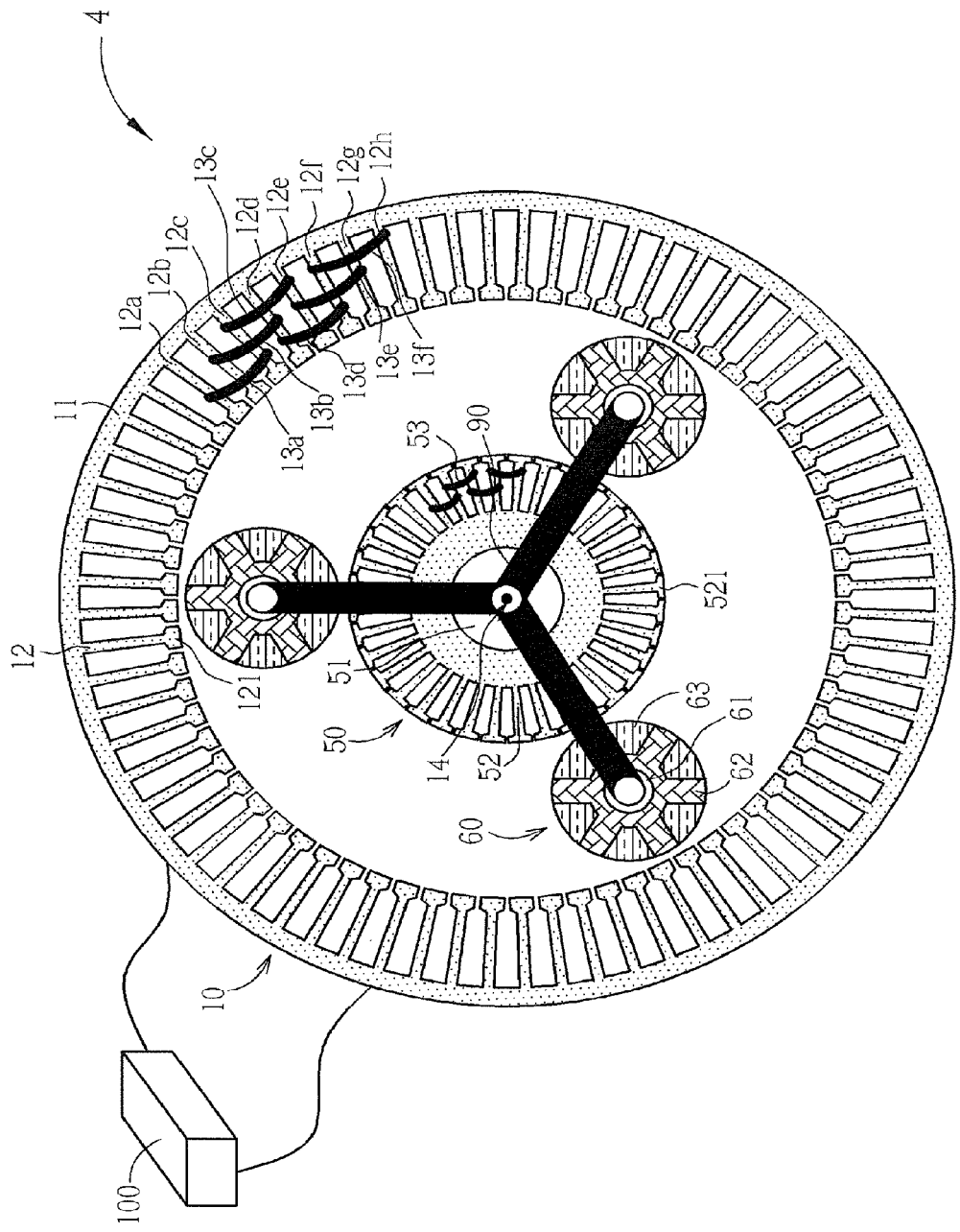
FIG. 4 is an illustration of a magnetic planetary gear set according to a fourth embodiment of the invention.

Please refer to FIG. 4, which is an illustration showing a magnetic planetary gear set 4 according to a fourth embodiment of the invention. In the fourth embodiment, the magnetic planetary gear set 4 includes an outer stator 10, a sun stator 50, and a plurality of planet gears 60. Both the outer stator 10 and the sun stator 50 are implemented as variable electrically powered magnetic gear similar with the outer stator 10 and the sun stator 50 in the previous embodiments, which are stationary and needs no additional mechanism, like motors/generators, that is used in conventional outer gear and sun gear.

The plurality of planet gears 60, three in the fourth embodiment in FIG. 4 as an example, is disposed between the outer stator 10 and the sun stator 50. Each of the planet gears 60 includes a second axle 61 and a plurality of magnetic elements 62, which are preferably made of ferromagnetic material and distanced with one another when circularly arranged along the surface of the second axle 61 and are attracted by the variable magnetic sections of the outer stator 10 and/or the sun stator 50 such that the plurality of planet gears 60 revolves on their own axes or have orbital revolution with respect to the sun stator 50.

Figure 5:
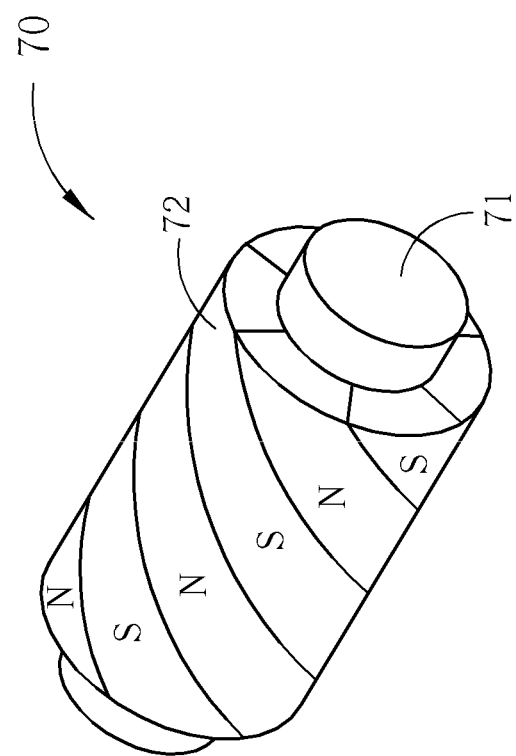
FIG. 5 is an illustration of a planet gear according to an embodiment of the invention.
Figure 6:
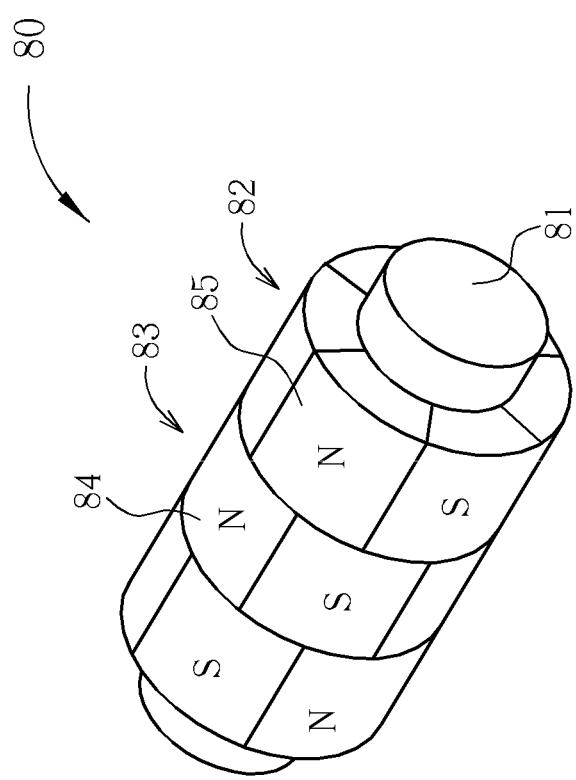
FIG. 6 is an illustration of a planet gear according to another embodiment of the invention.

Please refer to FIG. 5 and FIG. 6, where FIG. 5 is an illustration of a planet gear 70 according to an embodiment of the invention and FIG. 6 is an illustration of a planet gear 80 according to another embodiment of the invention. In the previous embodiments, the planet gear 30 may further be implemented to have axial structure as the planet gear 70 or the planet gear 80. For the planet gear 70, each magnetic element 72 is spiralled along the surface of the second axle 71. In FIG. 6, the planet gear 80 includes at least two circular sets of magnetic elements adjacent to each other, each circular set having magnetic elements with interlaced polarities. Furthermore, the magnetic elements of two adjacent circular sets with same polarity misaligning with each other. For example, the magnetic element 84 of the circular set 83 has the same polarity and misaligns with the magnetic element 85 of the circular set 82. Additionally, such structure of magnetic elements on the planet gears 70, 80 may also be implemented on the sun gear 20 or the outer gear 40 that also have many magnetic elements.

Figure 7:
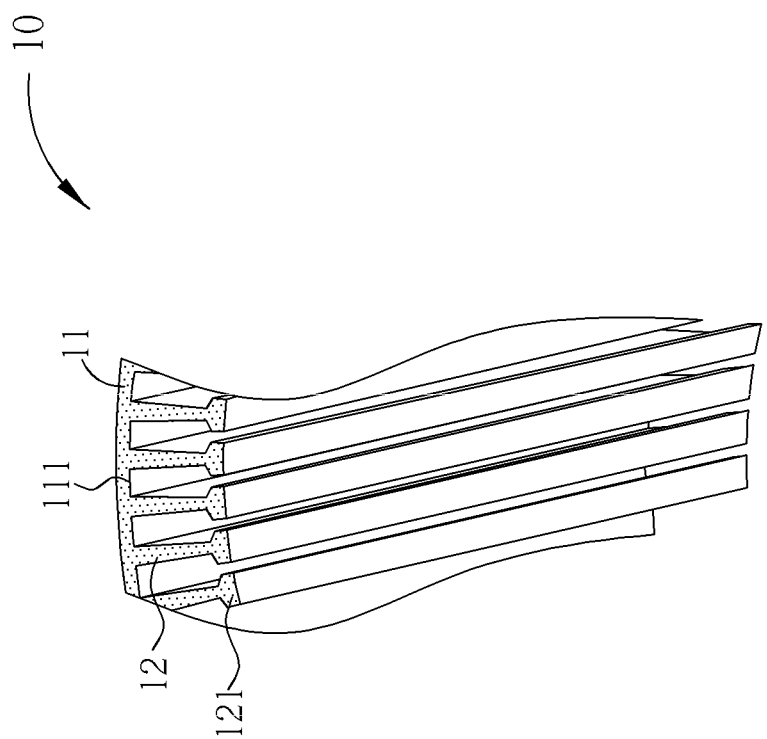
FIG. 7 is an illustration of an embodiment of the outer stator with pole heads spiralled on the inner surface of the body.
Figure 8:
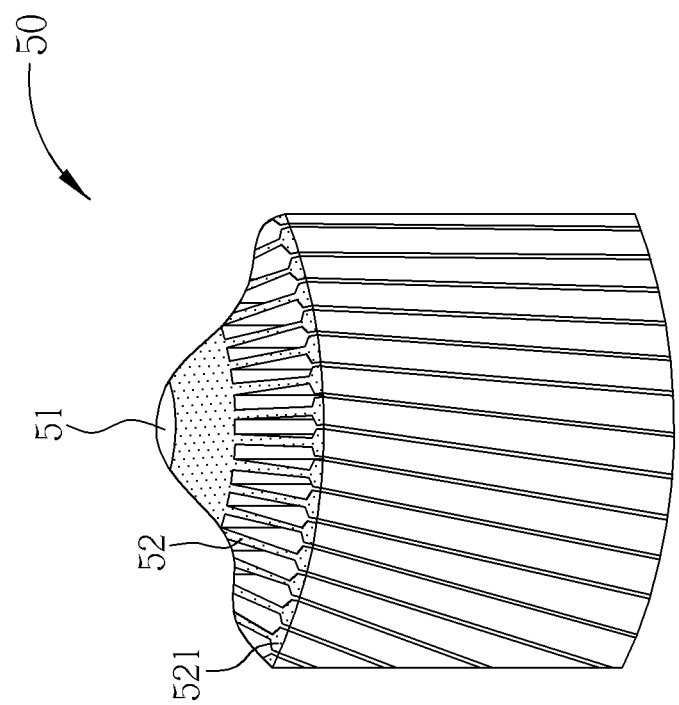
FIG. 8 is an illustration of an embodiment of the sun stator with pole heads spiralled on surface of the first axle.

Additionally, the pole heads of each stator, such as the pole heads 121 of the outer stator 10 in FIGS. 1, 3, and 4, or the pole heads 521 of the sun stator 50 in FIGS. 2, 3, and 4, may also be implemented to form skew slots on the stators. Please refer to FIG. 7, and FIG. 8. FIG. 7 shows an illustration of an embodiment of the outer stator 10 with pole heads 121 spiralled on the inner surface 111 of the body 11, and FIG. 8 shows an illustration of an embodiment of the sun stator 50 with pole heads 521 spiralled on surface of the first axle 51. The skew type pole heads increase the rotational smoothness when the planetary gear sets 1, 2, 3, 4 are operating.

The invention discloses a magnetic planetary gear set that uses stator of a motor/generator to provide magnetic sections. The electrically generated magnetic fields from the magnetic sections are variable under the excitation control of coils and driver so that either the outer stator or the sun stator of the magnetic planetary gear set may be stationary and still provide self-revolutionary magnetic propelling forces toward the planet gears disposed therebetween. No additional mechanism to rotate the stators is needed in the embodiments of the invention. The planet gears are also mounted on the planet arms, which provide different working modes by use of the planet arms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A magnetic planetary gear set, comprising:
    an annulus gear;
    a sun gear disposed at an inner center of the annulus gear and configured to revolve on its own axis,
    wherein at least one of the annulus gear and the sun gear is stationary and comprises a plurality of teeth circularly arranged by the axis of the sun gear, wherein each of the teeth comprises a pole head, one or a plurality of neighboring pole heads is intertwined with and excited by at least a group of coils to form a variable magnetic section, the plurality of pole heads forms a plurality of similar variable magnetic sections in interlaced polarities, and the polarity of each pole head is changed under the coil excitation control of a driver; and
    a plurality of planet gears disposed between the annulus gear and the sun gear, each planet gear comprising an axle and a plurality of magnetic elements circularly arranged along the surface of the axle;

wherein the plurality of planet gears is mounted on planet arms.

2. The magnetic planetary gear set of claim 1, wherein the annulus gear is an outer stator, stationary and comprising a body and the plurality of teeth circularly arranged along an inner surface of the body; and the sun gear comprises a first axle and a plurality of magnetic elements circularly arranged along the surface of the first axle, wherein the plurality of magnetic elements aligns with one another in interlaced polarities.

3. The magnetic planetary gear set of claim 2, wherein each of the plurality of teeth extends radially from the inner surface of the body toward the inner center of the outer stator.

4. The magnetic planetary gear set of claim 2, wherein each of the pole heads is arc-shaped and facing the magnetic elements of the planet gears, and is spiralled on the inner surface of the body.

5. The magnetic planetary gear set of claim 2, wherein the magnetic elements of the plurality of planet gears are permanent magnets aligning with one another in interlaced polarities and are capable of being propelled or attracted by the variable magnetic sections of the outer stator such that the plurality of planet gears revolves on their own axes when the planet arms are set to fix each planet gear at a position.

6. The magnetic planetary gear set of claim 2, wherein the magnetic elements of the plurality of planet gears are permanent magnets aligning with one another in interlaced polarities and are capable of being propelled or attracted by the variable magnetic sections of the outer stator such that the plurality of planet gears revolves on their own axes and have orbital revolution with respect to the sun gear when the planet arms are set to allow the planet gears to have displacement.

7. The magnetic planetary gear set of claim 2, wherein each of the magnetic elements of each planet gear and the sun gear is spiralled along the second axle on the surface of each corresponding second axle and along the first axle on the surface of the sun gear respectively.

8. The magnetic planetary gear set of claim 2, wherein the plurality of magnetic elements of each planet gear and the sun gear respectively comprises at least two circular sets adjacent to each other, each circular set having magnetic elements with interlaced polarities, and magnetic elements of two adjacent circular sets with same polarity misaligning with each other.

9. The magnetic planetary gear set of claim 2, wherein the plurality of magnetic elements of each planet gear is made of ferromagnetic material and distanced with one another when circularly arranged along the surface of the second axle of each planet gear and is attracted by the variable magnetic sections of the outer stator such that the plurality of planet gears revolves on their own axes or have orbital revolution with respect to the sun gear.

10. The magnetic planetary gear set of claim 1, wherein the annulus gear is an outer gear, revolving on its own axis and comprising a body and a plurality of magnetic elements circularly arranged along an inner surface of the body, wherein the plurality of magnetic elements aligns with one another in interlaced polarities; and the sun gear is a sun stator being stationary and comprising a first axle and the plurality of teeth circularly arranged along the surface of the first axle.

11. The magnetic planetary gear set of claim 10, wherein each of the plurality of teeth extends radially from the surface of the first axle, and is spiralled on the surface of the first axle.

12. The magnetic planetary gear set of claim 10, wherein each of the pole heads is arc-shaped and facing the magnetic elements of the planet gears.

13. The magnetic planetary gear set of claim 10, wherein the magnetic elements of the plurality of planet gears are permanent magnets aligning with one another in interlaced polarities and are capable of being propelled or attracted by the variable magnetic sections of the sun stator such that the plurality of planet gears revolves on their own axes when the planet arms are set to fix each planet gear at a position.

14. The magnetic planetary gear set of claim 10, wherein the magnetic elements of the plurality of planet gears are permanent magnets aligning with one another in interlaced polarities and are capable of being propelled or attracted by the variable magnetic sections of the sun stator such that the plurality of planet gears revolves on their own axes and has orbital revolution with respect to the sun stator when the planet arms are set to allow the planet gears to have displacement.

15. The magnetic planetary gear set of claim 10, wherein each of the magnetic elements of each planet gear and the outer gear is spiralled along the second axle on the surface of each corresponding second axle and along the inner surface of the body of the outer gear respectively.

16. The magnetic planetary gear set of claim 10, wherein the plurality of magnetic elements of each planet gears and the outer gear respectively comprises at least two circular sets adjacent to each other, each circular set having magnetic elements with interlaced polarities, and magnetic elements of two adjacent circular sets with same polarity misaligning with each other.

17. The magnetic planetary gear set of claim 10, wherein the plurality of magnetic elements of each planet gear is made of ferromagnetic material and distanced with one another when circularly arranged along the surface of the second axle of each planet gear and is attracted by the variable magnetic sections of the sun stator such that the plurality of planet gears revolves on their own axes or has orbital revolution with respect to the sun gear.

18. The magnetic planetary gear set of claim 1, wherein the annulus gear is an outer stator, stationary and comprising a body and a plurality of first teeth circularly arranged along an inner surface of the body, wherein each of the first teeth comprises a first pole head, one or a plurality of neighboring first pole heads is intertwined with and excited by at least a group of coils to form a similar variable magnetic section, the plurality of first pole heads forms a plurality of variable magnetic sections in interlaced polarities, and the polarity of each first pole head is changed under the coil excitation control of a first driver; and the sun gear is a sun stator disposed at an inner center of the outer stator, the sun stator being stationary and comprising a first axle and a plurality of second teeth circularly arranged along the surface of the first axle, wherein each of the second teeth comprises a second pole head, one or a plurality of neighboring second pole heads is intertwined with and excited by at least a group of coils to form a similar variable magnetic section, the plurality of second pole heads forms a plurality of variable magnetic sections in interlaced polarities, and the polarity of each second pole head is changed under the coil excitation control of a second driver.

19. The magnetic planetary gear set of claim 18, wherein each of the plurality of first teeth extends radially from the inner surface of the body toward the inner center of the outer stator, and each of the plurality of second teeth extends radially from the surface of the first axle.

20. The magnetic planetary gear set of claim 18, wherein each of the first pole heads and the second pole heads is arc-shaped and facing the magnetic elements of the planet gears.

21. The magnetic planetary gear set of claim 18, wherein the magnetic elements of the plurality of planet gears are permanent magnets aligning with one another in interlaced polarities and are capable of being propelled or attracted by the variable magnetic sections of the outer stator or the sun stator such that the plurality of planet gears revolves on their own axes when the planet arms are set to fix each planet gear at a position.

22. The magnetic planetary gear set of claim 18, wherein the magnetic elements of the plurality of planet gears are permanent magnets aligning with one another in interlaced polarities and are capable of being propelled or attracted by the variable magnetic sections of the outer stator or the sun stator such that the plurality of planet gears revolves on their own axes and has orbital revolution with respect to the sun stator when the planet arms are set to allow the planet gears to have displacement.

23. The magnetic planetary gear set of claim 18, wherein each of the magnetic elements of each of the planet gears is spiralled along the second axle on the surface of each corresponding second axle.

24. The magnetic planetary gear set of claim 18, wherein the plurality of magnetic elements of each of the planet gears comprises at least two circular sets adjacent to each other, each circular set having magnetic elements with interlaced polarities, and magnetic elements of two adjacent circular sets with same polarity misaligning with each other.

25. The magnetic planetary gear set of claim 18, wherein the plurality of magnetic elements is made of ferromagnetic material and distanced with one another when circularly arranged along the surface of the second axle and is attracted by the variable magnetic sections of the outer stator or the sun stator such that the plurality of planet gears revolves on their own axes or has orbital revolution with respect to the sun gear.

26. The magnetic planetary gear set of claim 25, wherein the plurality of magnetic elements of each planet gear is spiralled on the surface of the second axle.

* * * * *